US006674065B2

(12) United States Patent
Atia et al.

(10) Patent No.: US 6,674,065 B2
(45) Date of Patent: Jan. 6, 2004

(54) METHOD AND SYSTEM FOR LINEARIZATION OF MOEMS TUNABLE FILTER SCAN

(75) Inventors: Walid A. Atia, Lexington, MA (US); Jeffrey A. Korn, Lexington, MA (US)

(73) Assignee: Axsun Technologies, Inc., Billerica, MA (US)

( * ) Notice: Subject to any disclaimer, the term of this patent is extended or adjusted under 35 U.S.C. 154(b) by 288 days.

(21) Appl. No.: 09/742,180

(22) Filed: Dec. 20, 2000

(65) Prior Publication Data

US 2002/0074485 A1 Jun. 20, 2002

(51) Int. Cl.$^7$ .............................................. G02B 26/00
(52) U.S. Cl. .................... 250/227.18; 359/578
(58) Field of Search .................... 250/226, 227.18, 250/227.17, 227.16, 227.26, 227.24; 385/15, 16, 31; 359/115, 124, 578, 579

(56) References Cited

U.S. PATENT DOCUMENTS

| 5,504,608 | A | * | 4/1996 | Neeves et al. | 359/124 |
| 5,646,762 | A | * | 7/1997 | Delavaux et al. | 398/180 |
| 5,940,205 | A |   | 8/1999 | Fugita | 359/305 |
| 5,943,147 | A |   | 8/1999 | Vanoli et al. | 359/110 |

FOREIGN PATENT DOCUMENTS

| EP | 1 011 213 A2 | 6/2000 | ............ H04B/10/08 |
| EP | 1 022 606 A2 | 7/2000 | ............ G02F/1/225 |
| WO | WO 00/41351 | 7/2000 | ............ H04J/14/02 |

* cited by examiner

Primary Examiner—Edward J. Glick
Assistant Examiner—Hoon Song
(74) Attorney, Agent, or Firm—J. Grant Houston

(57) ABSTRACT

One problem that arises in the context of controlling tunable filters, and more specifically, Fabry-Perot tunable filters concerns the control algorithms for these MOEMS devices. An optical filter system comprises a tunable optical filter that scans a pass band across a signal band to generate a filtered signal. A filter tuning voltage generator generates a tuning voltage to the optical tunable filter. A photodetector generates an electrical signal in response to the filtered signal. Finally, a controller, that is responsive to the photodetector, triggers the filter tuning voltage generator. To increase the ease at which the results of a scan of the signal band of a WDM signal can be analyzed and improve spectral resolution, the change in the pass band of the tunable filter as a function of time is linearized in frequency or wavelength. This is achieved through the use of essentially an arbitrary waveform generator as the filter tuning voltage generator. The generator is programmed with an inverse of the filter's tuning characteristic.

11 Claims, 3 Drawing Sheets

METHOD AND SYSTEM FOR LINEARIZATION OF MOEMS TUNABLE FILTER SCAN

BACKGROUND OF THE INVENTION

Wavelength division multiplexing (WDM) systems typically comprise multiple separately modulated laser diodes at the transmitter. These laser diodes are tuned to operate at different wavelengths. When combined in an optical fiber, the WDM optical signal comprises a corresponding number of spectrally separated channels. Along the transmission link, the channels are typically collectively amplified in gain fiber, such as erbium-doped fiber and/or regular fiber, in a Raman pumping scheme. At the receiving end, the channels are usually separated from each other using thin film filter systems, to thereby enable detection by separate photodiodes.

The advantage of WDM systems is that the transmission capacity of a single fiber can be increased. Historically, only a single channel was transmitted in each optical fiber. In contrast, modern WDM systems contemplate hundreds or thousands of spectrally separated channels per fiber. Such configurations yield concomitant increases in the data rate capabilities of each fiber. Moreover, the cost per bit of data for WDM systems is typically less than comparative non-multiplexed systems. This is because any amplification system required along the link can essentially be shared by all of the separate channels transmitted in a single fiber link. With non-multiplexed systems, each channel/fiber would require its own amplification system.

The economics pulling for WDM in the context of long-haul optical links is only one factor suggesting the long-term applicability of the technology. Another application concerns the dynamic routing of individual wavelength slots or channels in optical WDM networks with multiple network access nodes. Such network functionality requires devices that can add and drop specific channels in an optical link.

SUMMARY OF THE INVENTION

One problem that arises in the context of controlling tunable filters, and more specifically, Fabry-Perot tunable filters concerns the control algorithms for these MOEMS devices. Specifically, to increase the ease at which the results of a scan of the signal band of a WDM signal can be analyzed, it would be desirable if the change in the pass band of the tunable filter as a function of time were linear or near linear in frequency or wavelength.

In general, according to one aspect, the present invention concerns an optical filter system. This filter system comprises a tunable optical filter that scans a pass band across a signal band to generate a filtered signal. A filter tuning voltage generator generates a tuning voltage to the optical tunable filter. A photodetector generates an electrical signal in response to the filtered signal. Finally, a controller, that is responsive to the photodetector, triggers the filter tuning voltage generator.

According to a preferred embodiment, the voltage generator generates a tuning voltage to the optical tunable filter that improves a linearization of the tuning pass band as a function of time over, at least, a portion of the scan of the signal band. In one implementation, the controller maps a pass band wavelength as a function of voltage for the tunable filter. This can be done with a look up table. In another implementation, the controller maps a pass band frequency as a function of voltage for the tunable filter. This can be done with a look up table.

In general, according to another aspect, the invention also concerns an optical filter tuning process. This process comprises a tunable filter scanning a pass band across in a signal band to generate a filtered signal. A non-linear tuning voltage is generated as a function of time and this tuning voltage is applied to the tunable filter. Finally, the filtered signal is detected from the tunable filter.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
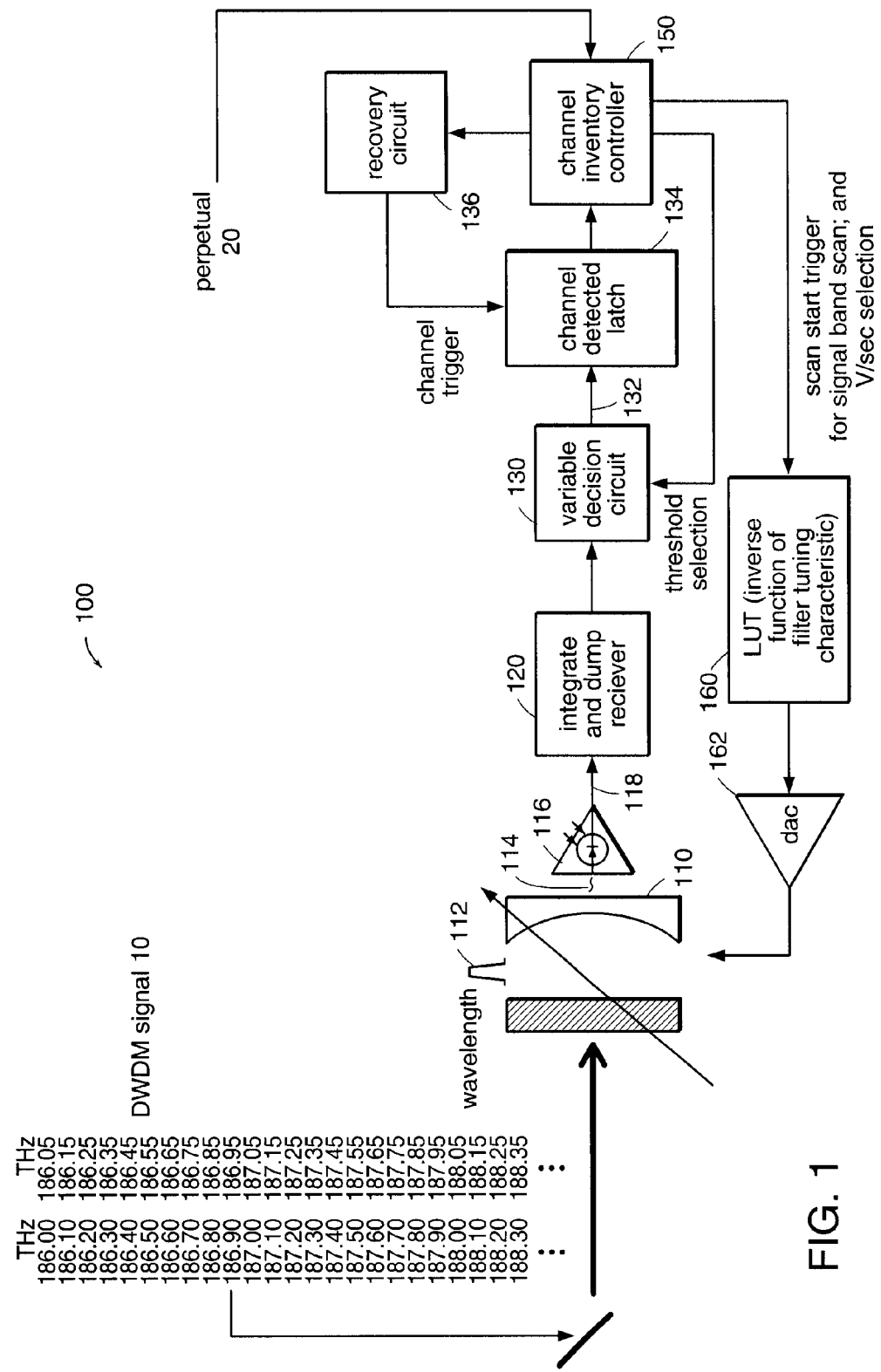
FIG. 1 is a block diagram showing a scanning optical monitoring system of the present invention.

FIG. 1 is a schematic block diagram illustrating an optical band scanning monitoring system 100, which has been constructed according to the principles of the present invention.

Specifically, a WDM signal 10 is received by a tunable optical filter 110. In preferred embodiment, this filter is an electrostatically deflected Fabry-Perot device and is preferably a high finesse device that has a tunable pass band that is narrow to resolve the individual channels in the WDM signal. In one implementation, the WDM signal is a DWDM signal that has multiple channel slots across a signal band of the WDM system. In the illustration of FIG. 1, the WDM signal has 100 GHz channel spacings according to the ITU grid or 50 GHz spacing according to the 50 GHz offset. Specifically, in such an implementation, the pass band of the tunable filter 110 is less than 25 GHz, and preferably less then 5 GHz.

In one embodiment, the free spectral range of the filter 110 is greater than the signal band of the WDM signal. Thus, it is preferably greater than 100 nanometers (nm), preferably about 120 nm. In another embodiment, the free spectral range is set to be about one half of the signal band, with two modes being used to scan the signal band. In this second implementation, a WDM filter is used along with two electronic channels to allow for simultaneous scanning. This general configuration is illustrated in U.S. patent application Ser. No. 09/648,263, filed on Aug. 25, 2000, entitled Optical Channel Monitoring System with Simultaneous C-Band and L-Band Detection, by Flanders, et al., the teachings of which are incorporated herein in their entirety by this reference.

The tunable filter 110 applies the graphically illustrated pass band 112 to yield a filtered optical signal 114. This is detected by photodetector 116. This photodetector or transducer converts the optical signal to an electrical signal 118.

The electrical signal that is generated in response to the filtered optical signal is received by a low pass filter 120. Specifically, this is an integrate-and-dump receiver, which has a time constant that is a function of the scan speed of the pass band and the bandwidth of the scanned channels.

The output from the low pass filter 120 is received by a decision circuit 130. This decision circuit preferably has a variable threshold. In its simplest implementation, this is simply an operational amplifier that is logic high or logic low depending on whether or not the signal from the low pass filter is above or below a threshold voltage that has been set by a digital to analog converter, for example. In the preferred embodiment of the system, the controller sets the level of the threshold. Further, by varying the threshold between scans, the controller can determine the power of the signals in the channel slots.

One advantage of the present invention is that it avoids the need for an analog to digital converter between the photodiode 116 and the controller. While providing for fast sampling, scan-to-scan delay can be large in systems using A/D converters because of the latency associated with dumping the acquired data to the controller. This can be avoided with the present invention. Specifically, in one embodiment, the scans are performed in less than millisecond. The threshold is changed between scans to thereby assess the power of individual channels by reference to other scans.

The decision circuit 130 produces a quasi-digital signal 132. It is a digital signal in the sense that it is either a logic high or logic low state. These state changes, however, may not be synchronized to any system clock of a controller. In one embodiment, signal 132 from the decision circuit 130 is received by a channel detect-latch 134. This latches the logic high or logic low signal 132 from the decision circuit 130 based upon a channel trigger from timing recovery circuit 136. This allows the controller 150 to sample the latched signal.

The controller 150 and recovery circuit 136 function as a phase locked loop that triggers the latch 134 when the pass band of the tunable filter is coincident with a channel slot in the signal band of the WDM signal 10. The timing recovery circuit phase locks on the time series generated by the scanning across the channel slots in the WDM signal 10.

The controller 150 by sampling the state of the channel detect latch as the pass band passes over channels in signal 10 is able to inventory the populated wavelength slots. As a result, it is able to determine which channels in the ITU grid contain actual optical carrier signals by reference to whether or not the power is above or below the applied threshold. This actual accumulated inventory information of the WDM signal 10 is then compared to perpetual inventory information 20 received from a system controller. This perpetual inventory information is the inventory that the controller 150 should have found in the DWDM signal, assuming the proper operation of upstream transmitting devices. In this way, the controller can identify faults when channels are present that should not be present by reference to the perpetual inventory or contrastingly, when channels are not present but are indicated as being present by the perpetual inventory information.

According to another aspect of the invention, the system 100 further comprises a filter tuning voltage generator 160. This generator 160 receives a scanstart trigger and/or voltage per second selection signal from the controller 150. Specifically, it generates through, preferably, a digital-to-analog converter 162 the tuning voltage to the tunable filter 110. Specifically, this tuning voltage is used to generate an electrostatic drive voltage in the tunable filter that causes the deflection of an optical membrane to yield the Fabry-Perot tunable cavity filter functionality.

In a preferred embodiment, the voltage generator 160 generates a tuning voltage to improve a linearization of the tuning of the pass band as a function of time over at least a portion of a scan of the signal band. This functionality is illustrated by reference to FIGS. 2A–2C.

Figure 2A:
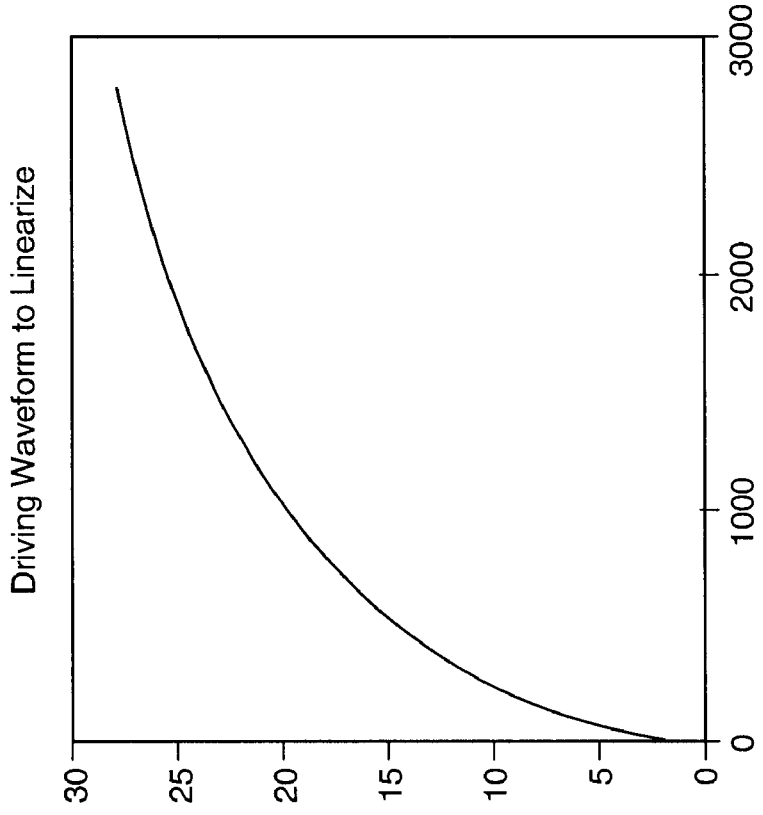
FIG. 2A is a plot of the pass band center wavelength in nanometers as a function of tuning voltage in Volts for the Fabry-Perot tunable filter.

By reference to FIG. 2A, typically, there is a non-linear relationship between the tuning voltage on the horizontal axis and the pass band center frequency of the tunable filter 110. This is due to the electrostatic characteristics of the drive cavity of these tunable filters and the membrane's mechanical characteristics. As a result, incremental changes in the tuning voltage in the early part of the scans, such as around 1550 to 1560 nanometers (nm) yield small shifts in the pass band center. In contrast, near the end of the scan as, for example, between 1620 and 1630 nm, relatively small changes in voltage yield large jumps in the pass band center.

Figure 2B:
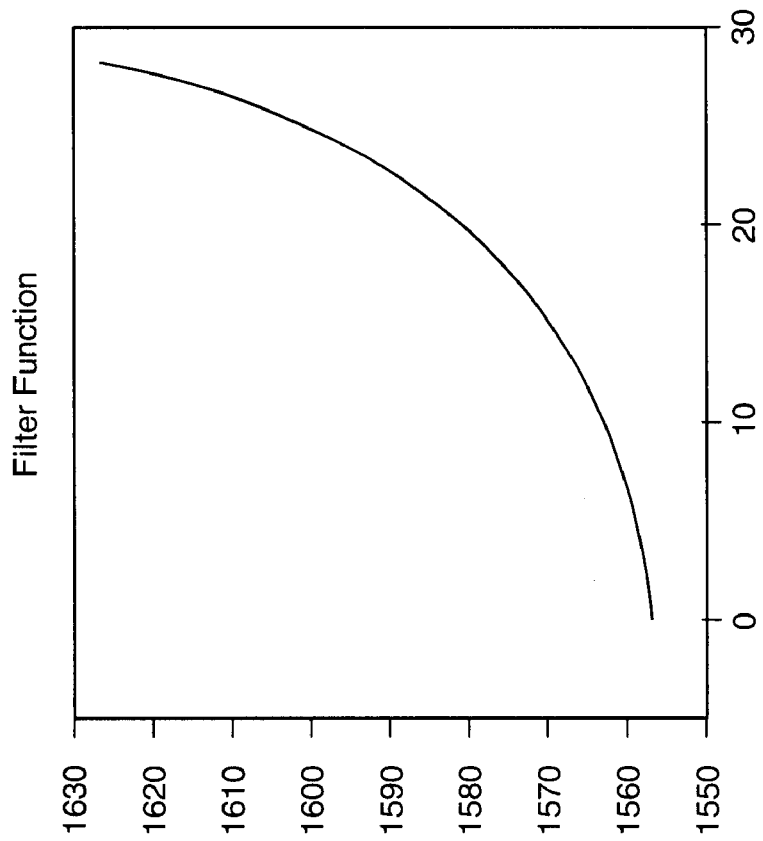
FIG. 2B is a plot of tuning voltage in Volts as a function of time in milliseconds to yield the linearization of the present invention.

According to one aspect, the tuning voltage generator 160 stores an inverse tuning characteristic as illustrated in FIG. 2B. Specifically, this function has the effect of yielding large changes in voltage as a function of time an early part of the scan and relatively small changes in the voltage as a function of time during the later part of the scan. As a result, when a trigger signal is applied to the tuning voltage generator, the stored function, as illustrated in FIG. 2B is applied to the filter 110.

Figure 2C:
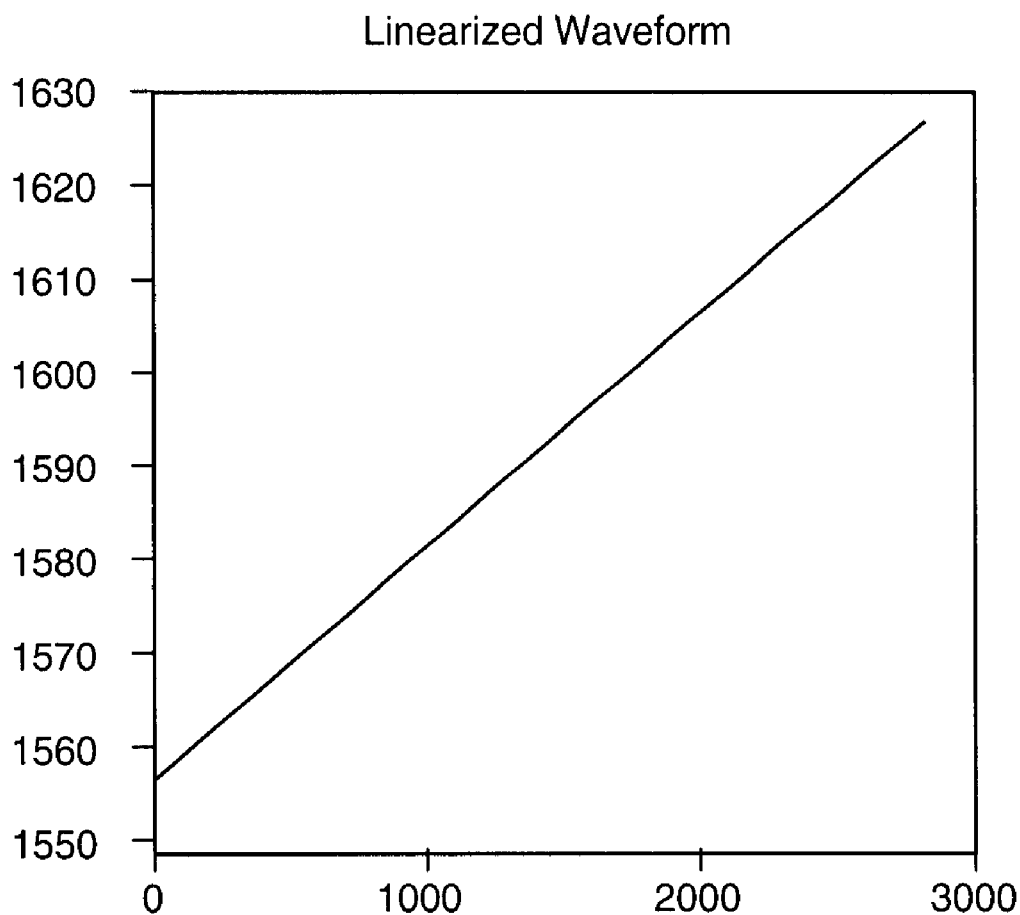
FIG. 2C is a plot of pass band in nanometers as a function of time in milliseconds showing the resultant linearized pass band tuning of the present invention.

As shown by FIG. 2C, when the inverse tuning characteristic is applied to the tunable filter, a linear frequency tuning relationship results, i.e., the tuning of the pass band is linear with time. In one implementation, the tuning is linear with wavelength in time, as illustrated. Alternatively, the tuning is linear with frequency in time. As a result, this allows the time recovery circuit 136 to expect a consistent or near consistent channel-to-channel delay across all or part of the scan allowing it to phase lock onto the power peak series as if it were a clock series to thereby control the latch 134. Further, the controller and recovery circuit are able to identify whether or not a slot is populated by reference to the delay from the generation of the start trigger to the inverse function generator 160.

Generally, whether the filter is linearized in frequency or wavelength depends on the application. Modern WDM systems specify channel spacings in frequency, whereas spectral analysis typically bases analysis in wavelength.

While this invention has been particularly shown and described with references to preferred embodiments thereof, it will be understood by those skilled in the art that various changes in form and details may be made therein without departing from the scope of the invention encompassed by the appended claims.

What is claimed is:

1. An optical filter system, comprising:
   an electrostatically tunable optical filter that scans a pass band across a signal band to generate a filtered signal;
   a filter tuning voltage generator that generates a electrostatic tuning voltage to the optical tunable filter, the filter tuning voltage generator generating a time varying electrostatic tuning voltage to the optical tunable filter that improves a linearization of the tuning of the pass band as a function of time over at least a portion of the scan of the signal band;

a photo detector that generates an electrical signal in response to the filtered signal; and a controller that is responsive to the photodetector and that triggers the filter tuning voltage generator.

2. A scanning optical monitor system as claimed in claim 1, wherein the controller maps a pass band wavelength as a function of delay from a generation of a trigger to the filter tuning voltage generator.

3. A scanning optical monitor system as claimed in claim 1, wherein the filter tuning voltage generator comprises a look-up table.

4. An optical filter system tuning process, comprising:

an electrostatically tunable optical filter scanning a pass band across a signal band to generate a filtered signal;

generating a non-linear electrostatic tuning voltage that changes non-linearly as a function of time in order to improve a linearization of tuning of the pass band of the electrostatically tunable optical filer as a function of time;

applying the electrostatic tuning voltage to the tunable optical filter; and detecting a filtered signal from the tunable optical filter.

5. A tuning process as claimed in claim 4, further comprising a pass band of the tunable filter changing linearly with time at least over a portion of the scan of the signal band.

6. A tuning process as claimed in claim 4, further comprising a pass band of the tunable filter changing linearly with time over a scan of half of the signal band.

7. An optical filter system, comprising:

an electrostatically tunable optical filter that scans a pass band across a signal band to generate a filtered signal;

a filter tuning voltage generator that generates an electrostatic tuning voltage to the optical tunable filter, the filter tuning voltage generator generating a time varying electrostatic tuning voltage to the optical tunable filter that improves a linearization of the tuning of the pass band as a function of time over at least a portion of the scan of the signal band.

8. A scanning optical monitor system as claimed in claim 7, wherein the filter tuning voltage generator comprises a look-up table.

9. An optical filter system tuning process, comprising:

an electrostatically tunable optical filter scanning a pass band across a signal band to generate a filtered signal;

generating a non-linear electrostatic tuning voltage that changes non-linearly as a function of time in order to improve a linearization of tuning of the pass band of the electrostatically tunable optic filter as a function of time;

applying the electrostatic tuning voltage to the tunable optical filter.

10. A tuning process as claimed in claim 9, further comprising a pass band of the tunable filter changing linearly with time at least over a portion of the scan of the signal band.

11. A tuning process as claimed in claim 9, further comprising a pass band of the tunable filter changing linearly with time over a scan of half of the signal band.

* * * * *